United States Patent
Richards et al.

(10) Patent No.: US 8,838,330 B2
(45) Date of Patent: Sep. 16, 2014

(54) DIAGNOSTICS FOR SMART SENSORS OF VEHICLES

(75) Inventors: Jeffrey S. Richards, Fenton, MI (US); Daniel P. Grenn, Highland, MI (US); Voytek A. Novak, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/435,332

(22) Filed: Mar. 30, 2012

(65) Prior Publication Data

US 2013/0261884 A1 Oct. 3, 2013

(51) Int. Cl.
*F02D 41/22* (2006.01)
*G06F 19/00* (2011.01)

(52) U.S. Cl.
USPC .......................................... 701/34.4; 701/29.1

(58) Field of Classification Search
USPC ............. 701/34, 29.1, 34.4; 702/183; 706/20; 324/426, 433, 123 R; 363/13; 73/579
See application file for complete search history.

(56) References Cited

U.S. PATENT DOCUMENTS

| | | | |
|---|---|---|---|
| 6,211,681 B1 * | 4/2001 | Kagawa et al. | 324/426 |
| 7,624,080 B1 * | 11/2009 | Morales et al. | 706/20 |
| 2005/0254265 A1 * | 11/2005 | Yamada | 363/13 |
| 2007/0034009 A1 * | 2/2007 | Pado | 73/579 |
| 2007/0294002 A1 * | 12/2007 | Underdal et al. | 701/29 |
| 2009/0216493 A1 * | 8/2009 | Underdal et al. | 702/183 |
| 2009/0237087 A1 * | 9/2009 | Anbari | 324/433 |
| 2010/0321002 A1 * | 12/2010 | Suquet | 324/123 R |
| 2013/0261884 A1 * | 10/2013 | Richards et al. | 701/34.4 |

* cited by examiner

*Primary Examiner* — Tuan C. To
*Assistant Examiner* — Yuri Kan
(74) *Attorney, Agent, or Firm* — Ingrassia Fisher & Lorenz, P.C.

(57) ABSTRACT

Methods, program products, and vehicles are provided for providing diagnostics for a smart sensor, such as a direct current (DC) converter, for a vehicle. A result of a diagnostic test is received from the smart sensor at a first time. A sequence indicator is retrieved from memory. The sequence indicator pertains to a second time in which the diagnostic test is expected to be completed by the smart sensor. A health assessment is provided using the result via a processor, provided that the second time does not precede the first time. The health assessments may be linked individually to a diagnostic trouble code, or may be grouped together and linked as a group to a diagnostic trouble code. Multiple smart sensor health assessments may be grouped and linked to diagnostic trouble codes.

17 Claims, 5 Drawing Sheets

DIAGNOSTICS FOR SMART SENSORS OF VEHICLES

TECHNICAL FIELD

The present disclosure generally relates to the field of vehicles and, more specifically, to methods and systems for performing diagnostics for a smart sensor for a vehicle.

BACKGROUND

Certain vehicles today include one or more "smart sensors", as referred to in the industry. A smart sensor, as referenced herein, refers to a device that includes a sensing element as well as a processing element. Such smart sensors may conduct diagnostic tests on vehicle components or systems that can then be interpreted or compiled by a separate processing device. However, it may be desirable to provide improved diagnostics for smart sensors for vehicles to differentiate a sensor fault from a vehicle system fault.

Accordingly, it is desirable to provide improved methods for providing diagnostics for smart sensors of vehicles. It is also desirable to provide improved program products and systems for providing such diagnostics for smart sensors for vehicles. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. In accordance with the method, a result of a diagnostic test is received from the smart sensor at a first time. A sequence indicator is retrieved from memory. The sequence indicator pertains to a second time in which the diagnostic test is expected to be completed by the smart sensor. A health assessment is provided using the result via a processor, provided that the second time does not precede the first time.

In accordance with another exemplary embodiment, a program product is provided. The program product comprises a program and a non-transitory computer-readable storage medium. In accordance with the program, a result of a diagnostic test is received from the smart sensor at a first time. A sequence indicator is retrieved from memory. The sequence indicator pertains to a second time in which the diagnostic test is expected to be completed by the smart sensor. A health assessment is provided using the result via a processor, provided that the second time does not precede the first time. The non-transitory computer-readable storage medium stores the program.

In accordance with a further exemplary embodiment, a vehicle is provided. The vehicle includes an engine, a rechargeable energy storage system (RESS), a direct current (DC) converter, and a controller. The RESS at least facilitates turning on the engine. The DC converter is coupled to the RESS. The controller is coupled to the DC converter, and comprises a memory and a processor. The memory is configured to store a sequence indicator pertaining to an execution time in which a diagnostic test is expected to be completed by the DC converter. The processor is coupled to the memory, and is configured to receive a result of the diagnostic test from the DC converter at a receiving time and provide a health assessment using the result, provided that the execution time does not precede the receiving time.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
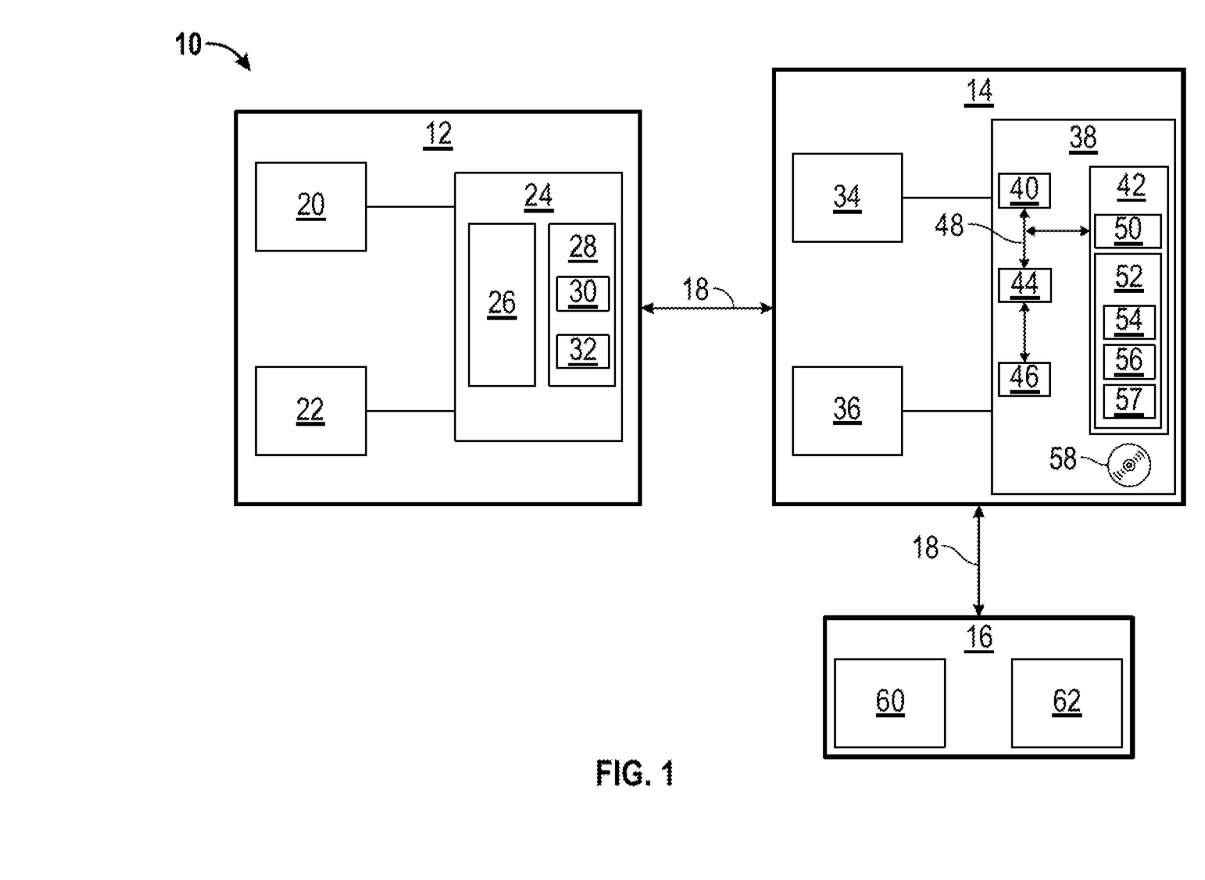
FIG. 1 is a functional block diagram of a system that includes a smart sensor and a controller that analyzes diagnostics for the smart sensor, for application in a vehicle, in accordance with an exemplary embodiment.

FIG. 1 is a functional block diagram of a system 10 for a vehicle, in accordance with an exemplary embodiment. The system 10 includes a smart sensor 12, a control system 14, and a notification unit 16 (preferably including an audio component 60 and/or a visual component 62), which are coupled together via a vehicle communications bus 18.

As depicted in FIG. 1, the smart sensor 12 includes a sensor array 20, a transceiver 22, and a processing unit 24. In one embodiment in which the smart sensor 12 comprises a direct current (DC) converter (described further below in connection with FIG. 2), the sensor array 20 includes one or more voltage sensors that measure a voltage of the smart sensor 12. The transceiver 22 transmits diagnostic test results (performed by the processor 26), to the control system 14 via the communications bus 18 of the vehicle. The processing unit 24 is coupled to the sensor array 20 and the transceiver 22. The processing unit 24 directs operation of the smart sensor 12 and the transceiver 22, runs diagnostic tests on the smart sensor 12 and components thereof, and directs transmission of results of the diagnostic tests to the control system 14 by the transceiver 22 via the communications bus 18.

In the depicted embodiment, the processing unit 24 includes a processor 26 and a memory 28. The processor 26 performs the computation and control functions of the processing unit 24, and may comprise any type of processor or multiple processors, single integrated circuits such as a microprocessor, or any suitable number of integrated circuit devices and/or circuit boards working in cooperation to accomplish the functions of a processing unit. During operation, the processor 26 executes one or more programs 30 contained within the memory 28 and, as such, controls the general operation of the processing unit 24 and the computer system of the processing unit 24.

In addition, the processor 26 performs various diagnostic tests 32 for the smart sensor 12, and directs the transceiver 22 to transmit results of the diagnostic tests 32 along the communications bus 18 to the control system 14 for processing and analysis by the processor 40 thereof, in accordance with the steps of the process 300 of FIG. 3 described further below.

In certain embodiments, the diagnostic tests 32 pertain to the memory 28 of the smart sensor 12, and/or the processor 26 and/or the sensor array 20 of the smart sensor 12. In various embodiments the diagnostic tests 32 may include, among others: random access memory (RAM) testing, read only memory (ROM) testing, kernel checksum testing, calibration checksum testing, electrically erasable programmable read only memory (EEPROM) checksum testing, EEPROM parameter checksum testing, and application specific integrated circuit chip (ASIC) voltage reference testing, among other possible diagnostic tests for the smart sensor 12 of FIG. 1, such as the DC converter 102 of FIG. 2, described further below.

The memory 28 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 28 is located on and/or co-located on the same computer chip as the processor 26. In the depicted embodiment, the memory 28 stores the above-referenced program 30 as well as the above-referenced series of diagnostic tests 32 to be performed by the processor 26 with respect to the smart sensor 12 and the components thereof.

The control system 14 is coupled to the smart sensor 12. The control system 14 analyzes the results of the diagnostic tests 32 provided by the smart sensor 12 and provides further diagnostics for the smart sensor 12. When the control system 14 determines that there is a fault in the smart sensor 12, the control system 14 provides an alert via the notification unit 16 and provides remedial action as appropriate. For example, in one embodiment in which the smart sensor 12 comprises a DC converter for the vehicle, the control system 14 comprises an engine control module (ECM) that provides a check engine light for the driver via the notification unit 16 and terminates an auto-stop feature for an engine of the vehicle when a fault is detected for the smart sensor 12. The control system 14 preferably performs these functions in accordance with the steps of the process 300 described further below in connection with FIGS. 3-5.

As depicted in FIG. 1, the control system 14 includes a sensor array 34, a transceiver 36, and a controller 38. The sensor array 34 may include any number of sensors, such as voltage sensors and/or sensors that detect driver inputs (such as an accelerator pedal sensor and/or a brake pedal sensor). The transceiver 36 receives information from the smart sensor 12 (including the results of the diagnostic tests 32 for the smart sensor 12), and also provides signals for the notification unit 16 for providing appropriate alerts for a driver of the vehicle when a determination is made that there is a fault in the smart sensor 12.

The controller 38 is coupled to the sensor array 34 and the transceiver 36. The controller 38 directs operation of the control system 14, including the sensor array 34 and the transceiver 36. The controller 38 analyzes the diagnostic tests for the smart sensor 12, provides further diagnostics for the smart sensor 12, and provides a notification for the driver and remedial action, as appropriate, if a fault is detected for the smart sensor. In a preferred embodiment, the controller 38 performs these functions in accordance with steps of the process 300 described further below in connection with FIGS. 3-5.

As depicted in FIG. 1, the controller 38 comprises a computer system. In certain embodiments, the controller 38 may also include one or more of the sensor array 34, the transceiver 36, the notification unit 16, and/or components thereof. In addition, it will be appreciated that the controller 38 may otherwise differ from the embodiment depicted in FIG. 1. For example, the controller 38 may be coupled to or may otherwise utilize one or more remote computer systems and/or other control systems.

In the depicted embodiment, the computer system of the controller 38 includes a processor 40, a memory 42, an interface 44, a storage device 46, and a bus 48. The processor 40 performs the computation and control functions of the controller 38, and may comprise any type of processor or multiple processors, single integrated circuits such as a microprocessor, or any suitable number of integrated circuit devices and/or circuit boards working in cooperation to accomplish the functions of a processing unit. During operation, the processor 40 executes one or more programs 50 contained within the memory 42 and, as such, controls the general operation of the controller 38 and the computer system of the controller 38, preferably in executing the steps of the processes described herein, such as the steps of the process 300 in connection with FIGS. 3-5.

The memory 42 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 42 is located on and/or co-located on the same computer chip as the processor 40. In the depicted embodiment, the memory 42 stores the above-referenced program 50 along with a diagnostic test array 52. The diagnostic test array 52 includes a listing 54 of the diagnostic tests 32 and a sequence indicator 56 for each of the diagnostic tests 32 for the smart sensor 12. Specifically, the listing 54 includes an identification of each of the diagnostic tests 32, and a sequence indicator 56 details an amount of time and/or a number of loops and/or cycles for each diagnostic test 32, representing how long it is expected to take for each particular diagnostic test 32 to be completed by the processor 26 of the smart sensor 12.

The bus 48 serves to transmit programs, data, status and other information or signals between the various components of the computer system of the controller 38. The interface 44 allows communication to the computer system of the controller 38, for example from a system driver and/or another computer system, and can be implemented using any suitable method and apparatus. It can include one or more network interfaces to communicate with other systems or components. The interface 44 may also include one or more network interfaces to communicate with technicians, and/or one or more storage interfaces to connect to storage apparatuses, such as the storage device 46.

The storage device 46 can be any suitable type of storage apparatus, including direct access storage devices such as hard disk drives, flash systems, floppy disk drives and optical disk drives. In one exemplary embodiment, the storage device 46 comprises a program product from which memory 42 can receive a program 50 that executes one or more embodiments of one or more processes of the present disclosure, such as the steps of the process 300 of FIGS. 3-5, described further below. In another exemplary embodiment, the program product may be directly stored in and/or otherwise accessed by the memory 42 and/or a disk (e.g., disk 58), such as that referenced below.

The bus 48 can be any suitable physical or logical means of connecting computer systems and components. This includes, but is not limited to, direct hard-wired connections, fiber optics, infrared and wireless bus technologies. During operation, the program 50 is stored in the memory 42 and executed by the processor 40.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 40) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 38 may also otherwise differ from the embodiment depicted in FIG. 1, for example in that the computer system of the controller 38 may be coupled to or may otherwise utilize one or more remote computer systems and/or other control systems.

Figure 2:
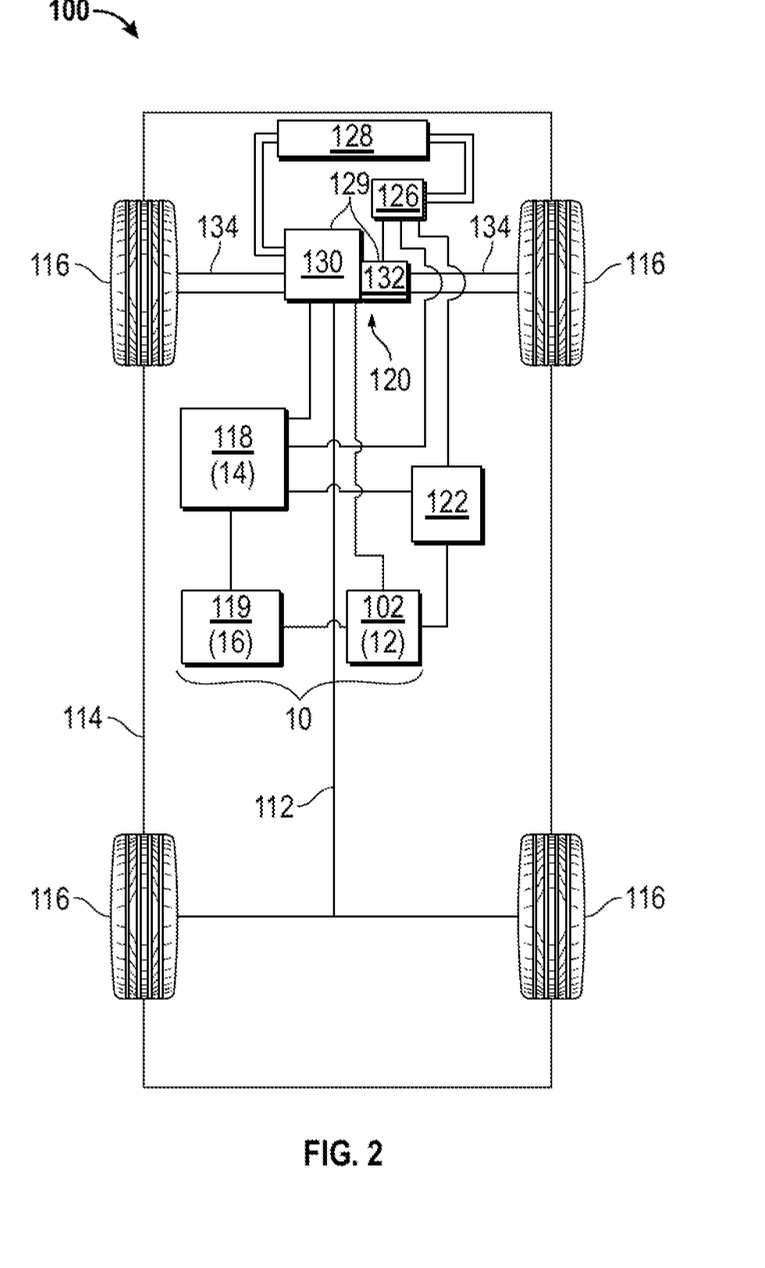
FIG. 2 is a functional block diagram of a vehicle in which the system of FIG. 1 may be implemented, in accordance with an exemplary embodiment.

FIG. 2 is a functional block diagram of a vehicle 100, or automobile, in which the system 10 of FIG. 1 may be implemented, in accordance with an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), any of which may be a hybrid or non-hybrid vehicle. The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 2, the vehicle 100 is a hybrid electric vehicle (HEV), and further includes a DC converter 102, an electronic control system (ECS) 118, a notification unit 119, an actuator assembly 120, a rechargeable energy storage system (RESS) 122, a power inverter assembly (or inverter) 126, and a radiator 128, each disposed within a body 114 of the vehicle 100. The vehicle 100 preferably includes the system 10 of FIG. 1, as follows: (i) the DC converter 102 preferably corresponds to the smart sensor 12 of FIG. 1; (ii) the ECS 118 preferably corresponds to the control system 14 of FIG. 1; (iii) and the notification unit 119 preferably corresponds to the notification unit 16 of FIG. 1.

The actuator assembly 120 includes at least one electric propulsion system 129 mounted on the chassis 112 that drives the wheels 116. In the depicted embodiment, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 2, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130.

The RESS 122 is mounted on the chassis 112, and is electrically connected to the inverter 126. The RESS 122 preferably comprises a battery having a pack of battery cells. In one embodiment, the RESS 122 comprises a lithium iron phosphate battery, such as a nanophosphate lithium ion battery. Together the RESS 122 and electric propulsion system(s) 129 provide a drive system to propel the vehicle 100.

The electronic control system (ECS) 118 preferably comprises an engine control module (ECM). The ECS 118 is preferably part of the control system 10 that controls the combustion engine 130. Specifically, the ECS 118 allows the combustion engine 130 to be automatically turned off (or stopped) when the vehicle is stopped (for example, at a traffic light), and to be automatically turned on (or started) again using power from the RESS 122 when the vehicle resumes movement. In one exemplary embodiment, the DC converter 102 provides a boost to the voltage of the RESS 122 as the combustion engine 130 is automatically turned on, so as to maintain a constant voltage during this time, in an amount that is preferably equal to the RESS 122 voltage just prior to the beginning of the automatic starting of the combustion engine 130 for this embodiment.

Figure 3:
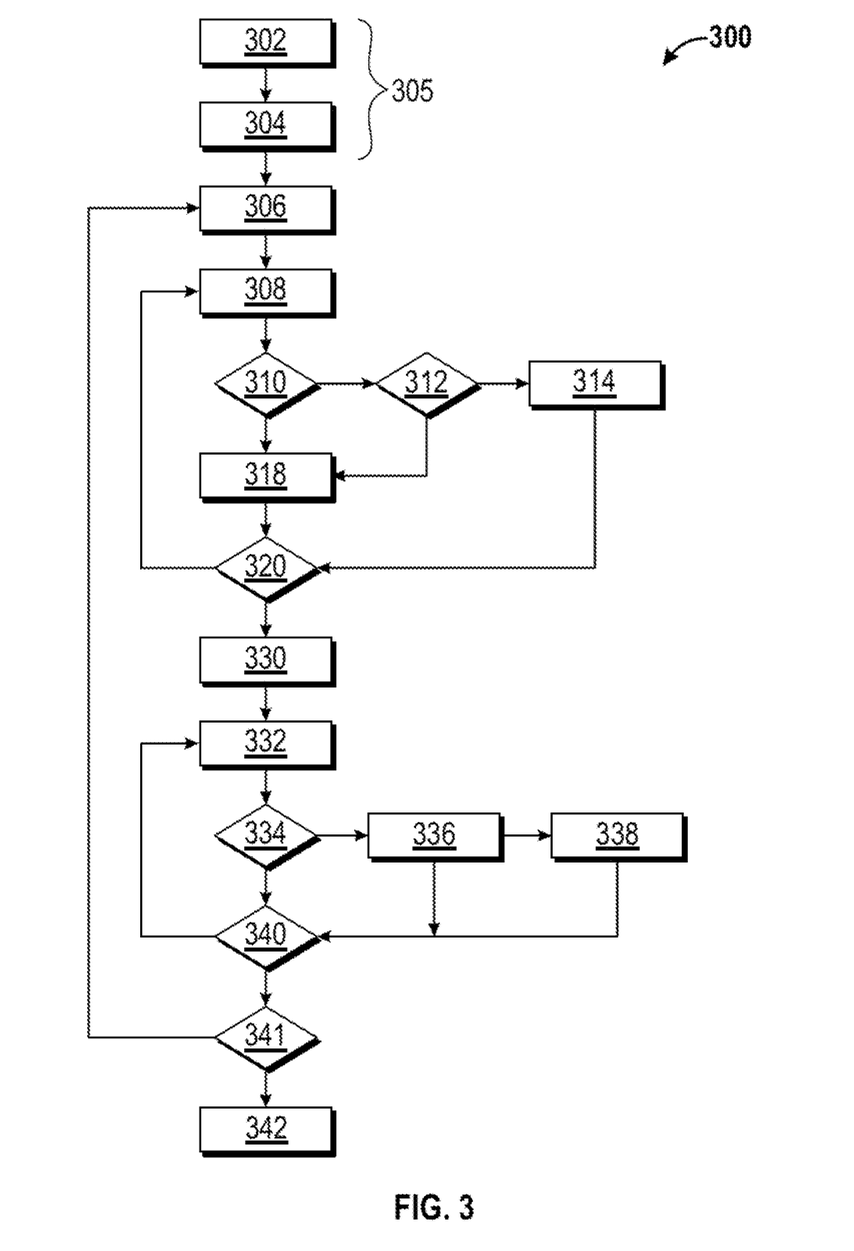
FIG. 3 is a flowchart of a process for providing diagnostics for a smart sensor of a vehicle, and that can be used in connection with the system of FIG. 1 and the vehicle of FIG. 2 in accordance with an exemplary embodiment.

FIG. 3 provides a flowchart of a process 300 for providing diagnostics for a smart sensor of a vehicle, in accordance with an exemplary embodiment. The process 300 can be implemented in connection with the system 10 of FIGS. 1 and 2, the vehicle 100 of FIG. 2, and various components thereof, in accordance with an exemplary embodiment.

As depicted in FIG. 3, the process 300 includes the step of receiving a diagnostic test array (step 302). The diagnostic test array preferably includes a listing of diagnostic tests for a smart sensor of a vehicle along with a sequence indicator (step 304) for each of the diagnostic tests. The sequence indicator includes, for each of the diagnostic tests, a representation (for example, a point of time, a number of loops or iteration, or another time measure) of when each of the diagnostic tests are expected to be completed by the smart sensor. The sequence indicator is preferably received by a controller that is disposed remote from, but coupled to, the smart sensor.

In a preferred embodiment, as referenced herein, the smart sensor corresponds to the smart sensor 12 of FIG. 1, the controller corresponds to the controller 38 of the control system 14 of FIG. 1, the diagnostic tests correspond to the diagnostic tests 32 of FIG. 1, the diagnostic test array corresponds to the diagnostic test array 52 of FIG. 1, the listing corresponds to the listing 54 of FIG. 1, and the sequence indicators correspond to the sequence indicators 56 of FIG. 1. In addition, in one embodiment, the smart sensor also corresponds to the DC converter 102 of FIG. 2 and the controller also corresponds to the ECS 118 of FIG. 2.

Figure 4:
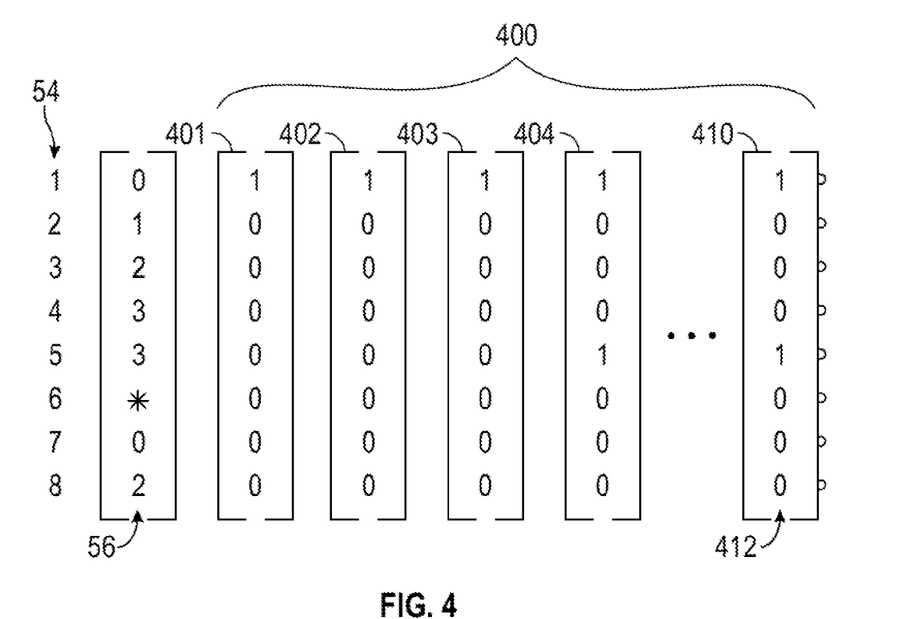
FIGS. 4 and 5 are schematic diagrams illustrating certain steps of the process of FIG. 3 in connection with the system of FIG. 1 and the vehicle of FIG. 2, in accordance with exemplary embodiments.

With reference to FIG. 4, the listing 54 of the diagnostic tests includes a numeral representation of the diagnostic tests (i.e., diagnostic test numbers 1, 2, 3, 4, 5, 6, 7, and 8 in the depicted example). Also with reference to FIG. 4, the sequence indicators 56 include a particular processor loop (preferably, pertaining to a loop or iteration of the processor 26 of FIG. 1) for each of the diagnostic tests. Specifically, in the example of FIG. 4, test numbers 1 and 7 are both expected to be completed immediately at the beginning of the current ignition cycle (i.e., loop 0, or when the ignition is first turned on during the ignition cycle), test number 2 is expected to be completed after loop 1 during the ignition cycle, test numbers 3 and 8 are expected to be completed after loop 2 during the ignition cycle, test numbers 4 and 5 are both expected to be completed after loop 3 during the ignition cycle, and test number 6 is expected to be completed at the end of the current ignition cycle (i.e., when the ignition is turned off, as represented by the "*" symbol in FIG. 4).

In a preferred embodiment, the diagnostic test array 302 is stored in the memory 42 of FIG. 1 by the processor 40 of FIG. 1. Steps 302 and 304 are referred to in FIG. 3 as a combined calibration step (step 305). The calibration step 305 occurs prior to an ignition cycle in which the remaining steps (namely, steps 306-342) take place. Preferably, the calibration step 305 utilizes information obtained from a vehicle manufacturer or supplier during manufacture or maintenance of the vehicle.

Once a current ignition cycle for the vehicle begins, information is received by the controller from the smart sensor (step 306). The information includes results of various diagnostic tests of the smart sensor at a first point in time (for example, corresponding to a particular loop of a processor of the smart sensor, such as the processor 26 of FIG. 1). The results preferably pertain to the diagnostic tests 32 of FIG. 1 as generated by the processor 26 of FIG. 1, and that are transported via the transceiver 22 of FIG. 1 along the communications bus 18 of FIG. 1 to the transceiver 36 of FIG. 1 and ultimately to the processor 40 of FIG. 1.

With reference again to FIG. 4, the received information is received over a plurality of processor loops 400. The processor loops 400 include a first loop 401 (preferably, the first loop following the beginning of the current ignition cycle), a second loop 402 (following the first loop 401), a third loop 403 (following the second loop 402), a fourth loop 404 (following the third loop 403), and so on, up until a final loop 410 of the current ignition cycle. It will be appreciated that the number of loops 400 may vary as may the number of diagnostic tests, and that the number of loops and the number of diagnostic tests are depicted in the example of FIG. 4 for illustrative purposes only.

During a first iteration of step 306, the first point in time preferably corresponds to a first processor loop following the beginning of the ignition cycle, preferably corresponding to the first loop 401 of FIG. 4. As explained in greater detail further below, step 306 will be repeated as well in future iterations at subsequent points in time for each loop of the processor during the ignition cycle.

With further reference to FIG. 4, in the depicted example, there is a result received for each diagnostic test at each loop 400. A result is transmitted by the smart sensor and received by the controller for each diagnostic test in each loop 400, regardless of whether the diagnostic test has been completed by the smart sensor. If the diagnostic test has been completed and an error was detected in the diagnostic test, then a value of "1" is transmitted by the smart sensor and received by the controller 38 (or in certain embodiments, controller 40) in that particular loop 400 for that particular diagnostic test. If the diagnostic test has been completed and no error was detected in the diagnostic test, then a value of "0" is transmitted by the smart sensor and received by the controller for that particular loop 400 for that particular diagnostic test. In addition, if the diagnostic test has not yet been completed, then a "placeholder" value of "0" is transmitted by the smart sensor and received by the controller 38 (or in certain embodiments, controller 40) for that particular loop 400 for that particular diagnostic test. Accordingly, the controller does not know, based only on the results themselves from step 306 obtained from the smart sensor, the complete status of the diagnostic tests during any particular iteration or point in time. Accordingly, the controller performs additional analysis using the previously-stored diagnostic test array, as described in the subsequent steps below.

A particular one of the diagnostic tests is selected for analysis for a present iteration (step 308). The selection of step 308 is performed by the controller, and preferably by the processor 40 thereof of FIG. 1.

A determination is made as to whether the particular diagnostic test of step 308 is expected to have been completed as of the current time (step 310) (preferably corresponding to the loop in which the results of step 306 pertain). This determination is preferably made by the processor 40 of FIG. 1 using the sequence indicator 56 for the particular diagnostic test of step 308. For example, with reference to FIG. 4, if the present iteration refers to test number 1 and the first loop 401, then the first test would be expected to be completed in the example of FIG. 4 (whereas the other tests would not be expected to have been completed by the first loop 401).

If it is determined in step 310 that the particular diagnostic test would be expected to be completed at the present point in time (e.g., the loop of step 306), then sufficient time has passed for a diagnostic assessment of the results for this particular diagnostic test. Accordingly, a determination is made as to whether an error is indicated in the particular diagnostic test (step 312). Specifically, a determination is made in step 312 as to whether the results from the most recent iteration of step 306 for the particular diagnostic test selected in step 308 indicates an error for the smart sensor. This determination is preferably made by the processor 40 of FIG. 1.

If it is determined in step 312 that an error is present for the results for the particular diagnostic test being examined, then a value of "1" (representing an error or fault) is stored as an indicator in the memory for this particular diagnostic test (step 314). This value is preferably stored by the processor 40 of FIG. 1 into the memory 42 of FIG. 1. The process then proceeds to step 320, described further below.

Conversely, if it is determined in step 312 that an error is not present for the result for the particular diagnostic test being examined at the current point in time, then a value of "0" (representing no error or fault) is stored in the memory for this particular diagnostic test (step 318). This value is preferably stored by the processor 40 of FIG. 1 into the memory 42 of FIG. 1. The process then proceeds to step 320, described further below.

In addition, with reference back to step 310, if it is determined that the particular diagnostic test would not be expected to be completed at the present point of time (e.g., the loop of step 306), then it is premature for a diagnostic assessment of the results for this particular diagnostic test, and accordingly a temporary value of "0" (representing no errors or faults) is stored in the memory for this particular diagnostic test (step 318). This value is preferably stored by the processor 40 of FIG. 1 into the memory 42 of FIG. 1. The process then proceeds to step 320, described directly below. It will be appreciated that in certain embodiments steps 314 and 318 may be considered to comprise a single step.

A determination is made as to whether there are any additional diagnostic tests to analyze for this particular time (step 320). Specifically, in a preferred embodiment, a determination is made in step 320 as to whether any of the diagnostic tests have not yet been selected for analysis during an iteration of step 308 for the present processor loop of step 306. This determination is preferably made by the processor 40 of FIG. 1.

If it is determined that there are additional diagnostic tests to analyze, the process returns to step 308, as a different diagnostic test is selected. Steps 308-320 are repeated until it is determined in an iteration of step 320 that each of the diagnostic tests have been analyzed for this time period, at which point the process proceeds to step 330.

In addition, in certain embodiments, the final results of the various diagnostic tests from steps 314 and 318 are aggregated with respect to groups of diagnostic tests sharing one or more common characteristics (for example, diagnostic tests pertaining to a common component of the smart sensor) (step 330). One of the groups is selected at a time in step 332. For each of the selected groups, a determination is made as to whether any of the diagnostic tests of the group has a fault detected in an iteration of step 314 (step 334). If such a fault has been detected, an error is reported for the group of diagnostic tests (step 336), and remedial action 338 may be taken. A determination is then made as to whether there are any additional groups to analyze (step 340), and steps 332-340 repeat until each of the groups is analyzed. Each of steps 330-340 is preferably performed by the processor 40 of FIG. 1.

Figure 5:
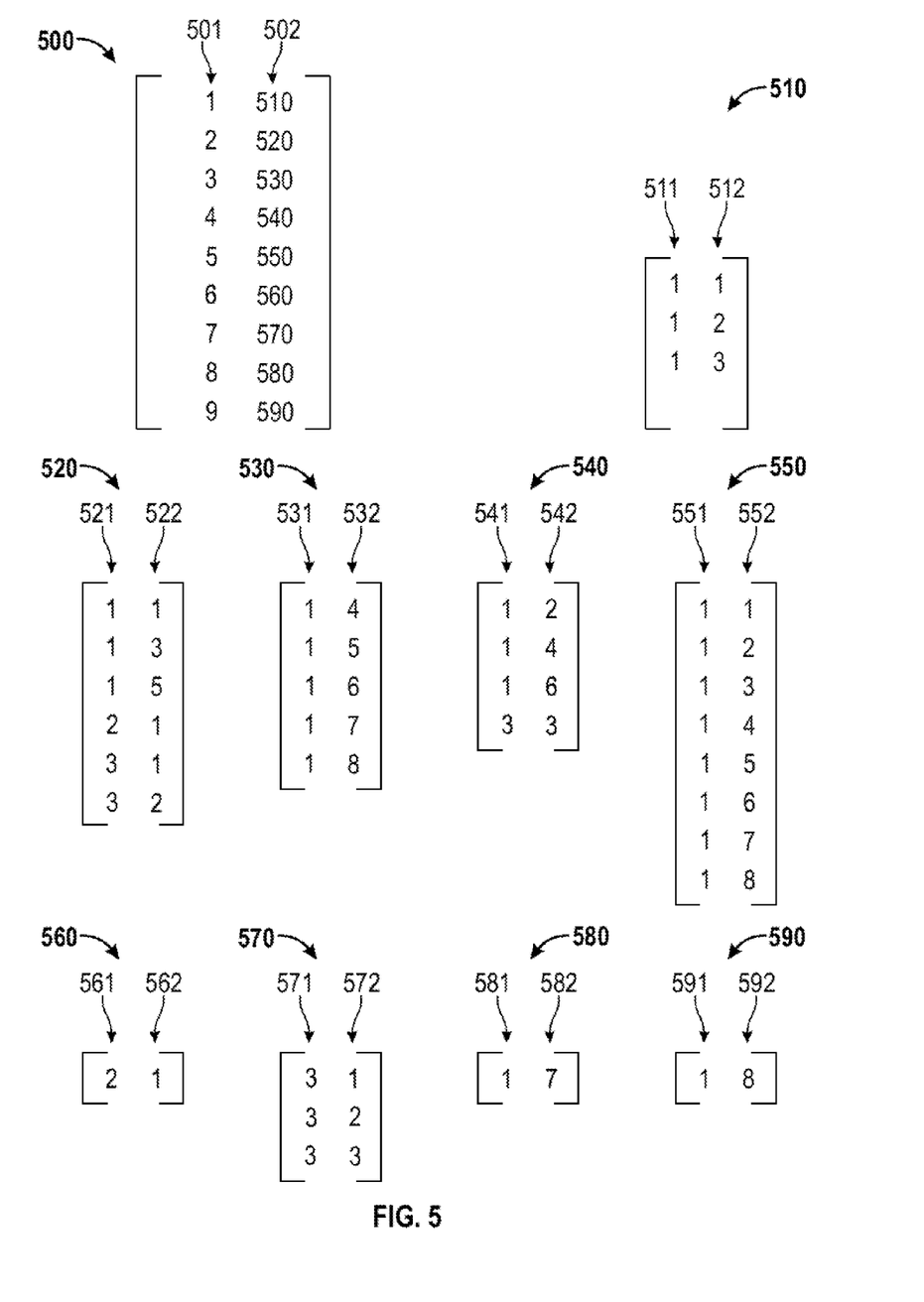

With reference to FIG. 5, exemplary various diagrams are provided showing exemplary groupings of steps 330-332, in accordance with an exemplary embodiment. The exemplary groupings of FIG. 5 refer to a scenario in which three smart devices (or smart sensors) are tested, although the number of tested smart devices may vary in other embodiments. A first diagram 500 illustrates a first group that defines the list of diagnostic trouble code (DTC) identifications 501 (denoted with DTC identification numbers 1, 2, 3, 4, 5, 6, 7, 8, and 9 in diagram 500) created for individual or combined sets of smart device, or smart devices, diagnostic tests 502 (denoted as diagnostic test groups 510, 520, 530, 540, 550, 560, 570, 580, and 590 in diagram 500). This grouping 500 is stored in controller 38 memory 42 as a calibration 57 for use in steps 332-340.

A second diagram (corresponding to above-mentioned group 510, and labeled accordingly as diagram 510 in FIG. 5) illustrates a grouping of various tests 512 pertaining to a single smart device 511 (in this case, referring to smart device number one), all of which will be linked to a specific DTC via the calibration defined in 500. As an exemplary embodiment, the second diagram 510 may pertain to memory space checksum tests for various memory elements of smart device number 1. Preferably, each of the memory space checksum tests for each of the smart devices may be grouped together in the second diagram 510.

A third diagram (corresponding to above-mentioned group 520, and labeled accordingly as diagram 530 in FIG. 5) illustrates a third grouping of various tests 522 pertaining to smart devices one, two, and three (listing 521), all of which will be linked to a specific DTC via the calibration defined in 500. As an exemplary embodiment, the third diagram 520 may pertain to memory read/write tests for the various smart devices of the device listing 521. Preferably, each of the memory read/write tests for each of the smart devices may be grouped together in the third diagram 520.

A fourth diagram (corresponding to above-mentioned group 530, and labeled accordingly as diagram 530 in FIG. 5) illustrates a fourth grouping of various tests 532 pertaining to a particular smart device listing 531 (in this case, corresponding to smart device number one), all of which will be linked to a specific DTC via the calibration defined in 500. As an exemplary embodiment, the fourth diagram 530 may pertain to an arbitrary group of tests that do not fit naturally into another group. Preferably, each of the arbitrary tests for each of the smart devices may be grouped together in the fourth diagram 530.

A fifth diagram (corresponding to above-mentioned group 540, and labeled accordingly as diagram 540 in FIG. 5) illustrates a fifth grouping of various tests 542 pertaining to a smart devices one and three (listing 541), all of which will be linked to a specific DTC via the calibration defined in 500. As an exemplary embodiment, the fifth diagram 540 may pertain to voltage reference tests for the various smart devices of the device listing 541. Preferably, each of the voltage reference tests for each of the smart devices may be grouped together in the fifth diagram 540.

A sixth diagram (corresponding to above-mentioned group 550, and labeled accordingly as diagram 550 in FIG. 5) illustrates a sixth grouping of various tests 552 pertaining to a particular smart device listing 551 (in this case, corresponding to smart device number one), all of which will be linked to a specific DTC via the calibration defined in 500. In the exemplary embodiment of the sixth diagram 550, a single DTC is reported for smart device number one and all of its tests, the number of which is defined by a calibration exemplified by FIG. 4, and shown to be eight tests in this example.

A seventh diagram (corresponding to above-mentioned group 560, and labeled accordingly as diagram 560 in FIG. 5) illustrates a seventh grouping of tests 562 pertaining to a particular smart device listing 561 (in this case, corresponding to smart device number two). In the exemplary embodiment of the seventh diagram 560, a single DTC is reported for smart device number two and all of its tests, the number of which is defined by a calibration exemplified by FIG. 4 and shown to be one test in this example.

An eighth diagram (corresponding to above-mentioned group 570, and labeled accordingly as diagram 570 in FIG. 5) illustrates an eighth grouping of tests 572 pertaining to a particular smart device listing 571 (in this case, corresponding to smart device number three), all of which will be linked to a specific DTC via the calibration defined in 500. In the exemplary embodiment of the eighth diagram 570, a single DTC is reported for smart device number three and all of its tests, the number of which is defined by a calibration exemplified by FIG. 4, and shown to be three tests in this example.

A ninth diagram (corresponding to above-mentioned group 580, and labeled accordingly as diagram 580 in FIG. 5) illustrates a ninth grouping of tests 582 pertaining to a particular smart device listing 581 (in this case, corresponding to smart device number one. In the exemplary embodiment of the ninth diagram 580, a single DTC is reported for smart device number one, test number seven. In the preceding examples, smart device number one was defined to have 8 tests, one of which, test number seven, is being linked to a specific DTC via the calibration defined in 500.

A tenth diagram (corresponding to above-mentioned group 590, and labeled accordingly as diagram 590 in FIG. 5) illustrates a ninth grouping of tests 592 pertaining to a particular smart device listing 591 (in this case, corresponding to smart device number one). In the exemplary embodiment of the tenth diagram 590, a single DTC is reported for smart device number one, test number eight. In the preceding examples, smart device number one was defined to have 8 tests, one of which, test number eight, is being linked to a specific DTC via the calibration defined in 500.

Returning now to FIG. 3, during step 341, a determination is made as to whether the ignition cycle is complete. This determination is preferably made by the processor 40 of FIG. 1. If the ignition cycle is complete, the process then terminates (step 342).

If it is determined that the ignition cycle is not complete, the process returns to step 306, as new results are obtained for the various diagnostic tests at a new time (preferably corresponding to a new processor loop). Steps 306-341 repeat until the results for each of the diagnostic tests are analyzed for each of the time periods/processor loops. With reference to FIG. 4, in this particular example, (i) a fault is determined for test number 1 after each of loops 401-410, (ii) a fault is determined for test number 5 after each of loops 404-410, and (iii) no faults are determined for test numbers 2, 3, 4, 6, 7, and 8.

It will be appreciated that the disclosed methods, systems, and vehicles may vary from those depicted in the Figures and described herein. For example, the system 10, smart sensor 12, control system 14, the notification unit 16, the vehicle 100, and/or various components thereof may vary from that depicted in FIGS. 1 and 2 and described in connection therewith. In addition, it will be appreciated that certain steps of the process 300 (and/or implementations of FIG. 4) may vary from those depicted in the Figures and/or described above in connection therewith. It will similarly be appreciated that certain steps of the process described above (and/or sub-processes or sub-steps thereof) may occur simultaneously or in a different order than that depicted in the Figures and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

We claim:

1. A method, comprising:
receiving a result of a diagnostic test for a smart sensor of a vehicle at a first time;
retrieving, from memory, a sequence indicator pertaining to a second time in which the diagnostic test is expected to be completed by the smart sensor;
providing an assessment as to whether there is a fault in the smart sensor via a processor based at least in part on the result and a comparison between the second time and the first time;
wherein the step of providing the assessment comprises:
determining that there is a fault in the smart sensor if the result is indicative of a fault in the smart sensor and the second time does not precede the first time; and
determining that there is no indication of a fault in the smart sensor if the second time precedes the first time.

2. The method of claim 1, wherein the steps of receiving the result, retrieving the sequence indicator, and providing the assessment occur during an ignition cycle of the vehicle, and the method further comprises:
storing the sequence indicator in the memory prior to the ignition cycle of the vehicle.

3. The method of claim 1, wherein the smart sensor includes a smart sensor memory, and the step of receiving the result comprises:
receiving the result of the diagnostic test from the smart sensor-at the first time, wherein the diagnostic test pertains to the smart sensor memory.

4. The method of claim 1, wherein the smart sensor comprises a direct current (DC) converter for the vehicle, and the step of receiving the result comprises:
receiving the result of the diagnostic test from the smart sensor at the first time, wherein the diagnostic test pertains to a test of the DC converter.

5. The method of claim 1, wherein:
the step of receiving the result comprises receiving the result at the first time, wherein the result is generated by a first device disposed within the smart sensor;
the step of retrieving the sequence indicator comprises retrieving the sequence indicator from the memory, the memory being disposed within a second device that is remote from the smart sensor; and
the step of providing the assessment comprises providing the assessment using the result via the processor, wherein the processor is disposed within the second device.

6. The method of claim 1, wherein:
the step of receiving the result comprises the step of receiving a plurality of results from the smart sensor at a plurality of first times, each of the plurality of results pertaining to a different one of a plurality of diagnostic tests for the smart sensor;
the step of retrieving the sequence indicator comprises the step of retrieving a plurality of sequence indicators, each of the plurality of sequence indicators pertaining to a corresponding second time at which a corresponding one of the plurality of diagnostic tests is expected to be completed by the smart sensor; and
the step of providing the assessment comprises providing a corresponding assessment for each particular diagnostic test of the plurality of diagnostic tests, based on a particular one of the plurality of results corresponding to the particular diagnostic test that is received at a particular one of the plurality of first times that corresponds with the corresponding second time for the particular diagnostic test and also based on a comparison between the corresponding second time and the particular one of the plurality of first times for the particular diagnostic test.

7. The method of claim 6, further comprising:
aggregating the assessments for each of the plurality of diagnostic tests;
determining that a fault is present in the smart sensor if any of the assessments provides an indication of an error, provided further that the corresponding second time does not precede the particular one of the plurality of first times for the particular diagnostic test; and
determining that the fault is not present if the corresponding second time precedes the particular one of the plurality of first times for the particular diagnostic test.

8. A program product, comprising:
a program configured to at least facilitate:
receiving a result of a diagnostic test for a smart sensor of a vehicle at a first time;
retrieving, from memory, a sequence indicator pertaining to a second time in which the diagnostic test is expected to be completed by the smart sensor; and
providing an assessment as to whether there is a fault in the smart sensor using the result and a comparison between the second time and the first time; and a non-transitory computer-readable storage medium storing the program,
wherein the program is further configured to at least facilitate:
determining that there is a fault in the smart sensor if the result is indicative of a fault in the smart sensor and the second time does not precede the first time; and
determining that there is no indication of a fault in the smart sensor if the second time precedes the first time.

9. The program product of claim 8, wherein:
the result is generated by a first device disposed within the smart sensor;
the memory is disposed in a second device disposed remote from the smart sensor; and
the assessment is provided by the second device.

10. The program product of claim 8, wherein the program is further configured to at least facilitate:
receiving a plurality of results from the smart sensor at a plurality of first times, each of the plurality of results pertaining to a different one of a plurality of diagnostic tests for the smart sensor;
retrieving a plurality of sequence indicators, each of the plurality of sequence indicators pertaining to a corresponding second time at which a corresponding one of the plurality of diagnostic tests is expected to be completed by the smart sensor; and
providing a corresponding assessment for each particular diagnostic test of the plurality of diagnostic tests, based on a particular one of the plurality of results corresponding to the particular diagnostic test that is received at a particular one of the plurality of first times that corresponds with the corresponding second time for the particular diagnostic test and also based on a comparison between the corresponding second time and the particular one of the plurality of first times for the particular diagnostic test.

11. The program product of claim 10, wherein the program is further configured to at least facilitate:
aggregating the assessments for each of the plurality of diagnostic tests; and
determining that a fault is present in the smart sensor if any of the assessments provides an indication of an error, provided further that the corresponding second time does not precede the particular one of the plurality of first times for the particular diagnostic test; and
determining that the fault is not present if the corresponding second time precedes the particular one of the plurality of first times for the particular diagnostic test.

12. A vehicle, comprising:
an engine;
a rechargeable energy storage system (RESS) that at least facilitates turning on the engine;
a direct current (DC) converter coupled to the RESS; and
a controller coupled to the DC converter, the controller comprising:
a memory configured to store a sequence indicator pertaining to an execution time in which a diagnostic test is expected to be completed by the DC converter; and
a processor coupled to the memory and configured to:
receive a result of the diagnostic test from the DC converter at a receiving time; and
provide an assessment as to whether there is a fault in the DC converter using the result and a comparison between the execution time and the receiving time,
wherein the processor is configured to at least facilitate:
determining that there is a fault in the smart sensor if the result is indicative of a fault in the smart sensor and the execution time precedes the receiving time; and
determining that there is no indication of a fault in the smart sensor if the receiving time precedes the execution time.

13. The vehicle of claim 12, wherein the processor is further configured to:
receive the result, retrieve the sequence indicator, and provide the health assessment during an ignition cycle of the vehicle; and
store the sequence indicator in the memory prior to the ignition cycle of the vehicle.

14. The vehicle of claim 12, wherein:
the DC converter includes a DC converter memory including one or more of a random access memory (RAM), a read only memory (ROM), and an electrically erasable programmable read only memory (EEPROM); and
the diagnostic test pertains to one or more of the following: testing of the RAM, testing of the (ROM), testing of the EEPROM, kernel checksum testing, calibration checksum testing, and application specific integrated circuit chip (ASIC) voltage reference testing.

15. The vehicle of claim 12, wherein:
the DC converter includes a DC converter processor configured to generate the result; and
the controller is disposed remote from the DC converter.

16. The vehicle of claim 12, wherein the processor is further configured to:
receive a plurality of results from the DC converter at a plurality of first times, each of the plurality of results pertaining to a different one of a plurality of diagnostic tests for the DC converter;
retrieve a plurality of sequence indicators from the memory, each of the plurality of sequence indicators pertaining to a corresponding second time at which a corresponding one of the plurality of diagnostic tests is expected to be completed by the DC converter; and
provide a corresponding assessment for each particular diagnostic test of the plurality of diagnostic tests, based on a particular one of the plurality of results corresponding to the particular diagnostic test that is received at a particular one of the plurality of first times that corresponds with the corresponding second time for the particular diagnostic test and also based on a comparison between the corresponding second time and the particular one of the plurality of first times for the particular diagnostic test.

17. The vehicle of claim 16, wherein the processor is further configured to:
aggregate the assessments for each of the plurality of diagnostic tests; and
determine that a fault is present in the DC converter if any of the assessments provides an indication of an error, provided further that the corresponding second time does not precede the particular one of the plurality of first times for the particular diagnostic test; and
determining that the fault is not present if the corresponding second time precedes the particular one of the plurality of first times for the particular diagnostic test.

\* \* \* \* \*